United States Patent
Colson et al.

(10) Patent No.: US 10,487,171 B2
(45) Date of Patent: Nov. 26, 2019

(54) HYDROPHOBIC POLYOLS

(71) Applicant: Dow Global Technologies LLC, Midland, MI (US)

(72) Inventors: Adam C. Colson, Boise, ID (US); Amber Marie Stephenson, Phoenixville, PA (US); Bindu Krishnan, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 62 days.

(21) Appl. No.: 15/577,903

(22) PCT Filed: May 27, 2016

(86) PCT No.: PCT/US2016/034564
§ 371 (c)(1),
(2) Date: Nov. 29, 2017

(87) PCT Pub. No.: WO2016/196258
PCT Pub. Date: Dec. 8, 2016

(65) Prior Publication Data
US 2018/0162988 A1    Jun. 14, 2018

Related U.S. Application Data

(60) Provisional application No. 62/169,071, filed on Jun. 1, 2015.

(51) Int. Cl.
| | |
|---|---|
| C08G 18/79 | (2006.01) |
| C08G 18/48 | (2006.01) |
| C09J 175/08 | (2006.01) |
| C08G 18/66 | (2006.01) |
| C08G 18/10 | (2006.01) |
| C08G 18/32 | (2006.01) |
| C09D 175/08 | (2006.01) |

(52) U.S. Cl.
CPC .......... *C08G 18/797* (2013.01); *C08G 18/10* (2013.01); *C08G 18/3206* (2013.01); *C08G 18/4804* (2013.01); *C08G 18/4808* (2013.01); *C08G 18/4854* (2013.01); *C08G 18/6674* (2013.01); *C08G 18/6677* (2013.01); *C09D 175/08* (2013.01); *C09J 175/08* (2013.01)

(58) Field of Classification Search
CPC ............. C08G 18/797; C08G 18/6677; C08G 18/4804; C08G 18/3206; C08G 18/4854; C08G 18/4808; C08G 18/10; C08G 18/6674; C09D 175/08; C09J 175/08
See application file for complete search history.

(56) References Cited

U.S. PATENT DOCUMENTS

| | | | |
|---|---|---|---|
| 4,687,788 A | 8/1987 | Hillshafer et al. | |
| 4,745,170 A | 5/1988 | Bushman et al. | |
| 5,162,387 A | 11/1992 | Abel et al. | |
| 5,247,049 A * | 9/1993 | Groll ................ | C08G 18/6674 252/182.23 |
| 6,103,850 A | 8/2000 | Reichel et al. | |
| 2012/0295104 A1 | 11/2012 | Barker | |

FOREIGN PATENT DOCUMENTS

| | | | |
|---|---|---|---|
| EP | 136396 | * | 4/1985 |
| WO | 2003050157 A1 | | 6/2003 |
| WO | 2015/183308 A1 | | 12/2015 |

OTHER PUBLICATIONS

PCT/US2016/034564, International Search Report and Written Opinion dated Aug. 16, 2016.
PCT/US2016/034564, International Preliminary Report on Patentability dated Dec. 14, 2017.

* cited by examiner

*Primary Examiner* — Rabon A Sergent

(57) ABSTRACT

A curable composition includes a reaction product of an isocyanate component that includes one or more isocyanates, at an isocyanate index being from 90 to 150, and an isocyanate reactive component that includes a blend including from 5 wt % to 95 wt % of a first butylene oxide based polyol and from 5 wt % to 95 wt % of a second butylene oxide based polyol. The first butylene oxide based polyol has a number average molecular weight from 200 g/mol to 1,000 g/mol and a nominal hydroxyl functionality from 2 to 6. The second butylene oxide based polyol has a number average molecular weight greater than 1,000 g/mol and less than 8,000 g/mol and a nominal hydroxyl functionality from 2 to 4. The blend accounts for at least 50 wt % of a total weight of polyols in the isocyanate-reactive component.

15 Claims, No Drawings

HYDROPHOBIC POLYOLS

FIELD

Embodiments relate to hydrophobic polyols for polyurethane based applications, polyurethane based applications (such as adhesives and coatings) that incorporate such hydrophobic polyols, methods of making such polyurethane based applications, and methods of using such polyurethane based applications.

INTRODUCTION

Thermosetting polyurethane polymers are commonly employed in a variety of industrial applications due to the broad range of physical and mechanical properties that can be achieved through judicious selection of formulation components. However, the long-term performance and durability of polyurethane materials may be adversely affected by exposure to high ambient humidity and/or by direct and prolonged contact with bulk water. In particular, it is believed that water has the potential to participate in chemical reactions that can degrade the polymer backbone in the polyurethane materials and/or may have a plasticizing effect on the polymer network (e.g., resulting in a reduction in properties such as tensile strength and/or modulus). Therefore, alternatives for forming polyurethane based applications such as adhesives and coatings are sought in which the resultant materials provide for increased performance even after exposure to high ambient humidity and/or by direct and prolonged contact with bulk water.

SUMMARY

Embodiments may be realized by providing a curable composition that includes a reaction product of an isocyanate component that includes one or more isocyanates, at an isocyanate index from 90 to 150, and an isocyanate-reactive component that includes a blend including from 5 wt % to 95 wt % of a first butylene oxide based polyol and from 5 wt % to 95 wt % of a second butylene oxide based polyol. The first butylene oxide based polyol has a number average molecular weight from 200 g/mol to 1,000 g/mol and a nominal hydroxyl functionality from 2 to 6. The second butylene oxide based polyol has a number average molecular weight greater than 1,000 g/mol and less than 8,000 g/mol and a nominal hydroxyl functionality from 2 to 4. The blend accounts for at least 50 wt % of a total weight of polyols in the isocyanate-reactive component. Embodiments may also be realized by providing a polyurethane based adhesive that includes the curable composition. Embodiments may be further realized by providing a polyurethane based coating that includes the curable composition.

DETAILED DESCRIPTION

A curable composition for forming polyurethane based applications may be prepared as a one-component or two-component system. Whereas, the one-component system may be a preformed (pre-reacted) curable polyurethane based composition that is applied as a single component to a substrate and allowed to cure to form an adhesive layer or a coating on the substrate. The two-component system may be a composition in which separate components are combined immediately before, during, or after application to a substrate and the resultant reaction mixture is allowed to cure to form a polyurethane based adhesive layer or coating on the substrate. Polyurethane based applications encompass adhesives, coatings, sealants, elastomers, and like applications as would be understood by a person of ordinary skill in the art. The curable compositions, according to exemplary embodiments, are well-formulated for use in adhesives and coatings.

The curable composition includes the reaction product of at least an isocyanate component and an isocyanate-reactive component. In embodiments, the isocyanate component that includes one or more isocyanates, which may be in the form of polyisocyanates and/or isocyanate-terminated prepolymers. The isocyanate-reactive component includes a blend of at least two different butylene oxide based polyols. By butylene oxide based polyols it is meant that at least 50 wt % (i.e., a majority) of the total weight of alkylene oxides used to form the polyether polyol is butylene oxide. For example, the butylene oxide based polyols have a butylene oxide content of at least 50 wt % (at least 60 wt %, at least 70 wt %, at least 80 wt %, and/or at least 90 wt %), and a remainder of the alkylene oxide content (if present) may be propylene oxide and/or ethylene oxide. For example, the butylene oxide based polyol may be an all butylene oxide polyol, i.e., 100 wt % of the alkylene oxide content is butylene oxide. The butylene oxide based polyol may be a polyoxybutylene-polyoxypropylene polyol that includes at least 50 wt %, at least 60 wt %, at least 70 wt %, at least 80 wt %, and/or at least 90 wt % of butylene oxide, and a remainder of at least 5 wt % of propylene oxide, based on the total alkylene oxide content.

Isocyanate Component

The isocyanate component includes at least one polyisocyanate and/or at least one isocyanate terminated prepolymer derived from at least one polyisocyanate. In exemplary embodiments, the isocyanate component may include additional additives.

Exemplary polyisocyanates include aromatic, cycloaliphatic, and aliphatic polyisocyanates. For example, polyisocyanates known in the art may be used. Examples of polyisocyanates include the 4,4'-, 2,4' and 2,2'-isomers of diphenylmethane diisocyante (MDI), modifications, and blends thereof (e.g., polymeric or monomeric MDI blends), 2,4- and 2,6-isomers of toluene-diisocyante (TDI), modifications, and blends thereof, m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate, diphenyletherdiisocyanate, 2,4,6-triisocyanatotoluene, 2,4,4'-triisocyanatodiphenylether, ethylene diisocyanate, and 1,6-hexamethylene diisocyanate. Derivatives of any of the foregoing polyisocyanate groups that contain, e.g., biuret, urea, carbodiimide, allophonate, and/or isocyanurate groups, may be used.

If included, the isocyanate-terminated prepolymer may have an isocyanate group (NCO) content of 1 wt % to 35 wt % (e.g., 5 wt % to 30 wt %, 10 wt % to 30 wt %, 15 wt % to 25 wt %, etc.), based on the total weight of the prepolymer. If present, one or more isocyanate terminated prepolymers may account for 20 wt % to 100 wt % (e.g., from 20 wt % to 80 wt %, from 30 wt % to 70 wt %, from 40 wt % to 60 wt %, from 45 wt % to 55 wt %, etc.) of the isocyanate component, and a remainder (if present) of the isocyanate component may be one or more polyisocyanates and/or at least one additives. If present, one or more isocyanate terminated prepolymers may account for 5 wt % to 30 wt % (e.g., from 10 wt % to 25 wt % and/or from 15 wt % to 25 wt %) of the total weight of the curable composition The prepolymer may be formed by the reaction of another isocyanate component with another isocyanate-reactive component (both different and separate from the isocyanate-component and isocyanate-reactive component of the curable composition), in which the isocyanate component is present in stoichiometric excess. For example, when a polyol contains an active hydroxyl group, the reaction of the active hydroxyl group with an isocyanate moiety results in the formation of a urethane linkage, as such the prepolymer may include both a urethane linkage and an isocyanate terminal group. For example, the prepolymer may be prepared in an one-pot procedure using at least one polyether polyol. As an example, the polyether polyol(s) used in preparing the prepolymer are derived from propylene oxide, ethylene oxide, and/or butylene oxide. In an example, the polyether polyol(s) used for forming the isocyanate-terminated prepolymer may be prepared using only propylene oxide and/or ethylene oxide.

An isocyanate index of the curable composition is from 90 to 150 (e.g., 90 to 130). By isocyanate index it is meant, a ratio of equivalents of isocyanate groups in the curable composition to the active hydrogen atoms in the curable composition for forming the polyurethane polymers, multiplied by 100. Said in another way, the isocyanate index is the molar equivalent of isocyanate (NCO) groups divided by the total molar equivalent of isocyanate-reactive hydrogen atoms present in a formulation, multiplied by 100. As would be understood by a person of ordinary skill in the art, the isocyanate groups in the curable composition may be provided through the isocyanate component and the active hydrogen atoms may be provided through the isocyanate reactive component.

Isocyanate-Reactive Component

The isocyanate-reactive component includes a blend of at least two different butylene oxide based polyols, i.e., a first butylene oxide based polyol and a second butylene oxide based polyol. The first butylene oxide based polyol is a relatively lower molecular weight polyol that has a number average molecular weight from 200 g/mol to 1,000 g/mol (e.g., from 400 g/mol to 800 g/mol, 500 g/mol to 700 g/mol, 550 g/mol to 650 g/mol, etc.) and that has a nominal hydroxyl functionality from 2 to 4. The second butylene oxide based polyol is a relatively higher molecular weight polyol that has a number average molecular weight greater than 1,000 g/mol and less than 8,000 g/mol (e.g., from 1,000 g/mol to 7,000 g/mol, from 1,000 g/mol to 5,000, from 1,000 g/mol to 4,000 g/mol, from 1,500 g/mol to 3,000 g/mol, from 1,750 g/mol to 2,500 g/mol, etc.) and that has a nominal hydroxyl functionality from 2 to 6. In embodiments, the first butylene oxide based polyol is present in an amount from 5 wt % to 95 wt % and the second butylene oxide based polyol is present in an amount from 5 wt % to 95 wt %, based on the total weight of the blend of the first and second butylene oxide based polyols.

In exemplary embodiments, the first butylene oxide based polyol may be derived from 75 wt % to 100 wt %, 85 wt % to 100 wt %, 90 wt % to 100 wt %, and/or 95 wt % to 100 wt % of butylene oxide, based on the total weight of alkylene oxides in the polyol (i.e., includes from 75 wt % to 100 wt %, 85 wt % to 100 wt %, 90 wt % to 100 wt %, and/or 95 wt % to 100 wt % of butylene oxide content). A remainder of the alkylene oxide content may be accounted for with propylene oxide and/or ethylene oxide. For example, the first butylene oxide based polyol may be derived form 75 wt % to 100 wt % of butylene oxide, based on a total weight of alkylene oxides, and has a nominal hydroxyl functionality of 3. For example, the first butylene oxide based polyol may be a polyoxybutylene polyol, a polyoxybutylene-polyoxypropylene polyol, or a polyoxybutylene-polyoxyethylene having a nominal hydroxyl functionality of 3. In exemplary embodiments, the butylene oxide content based on the total weight of the first butylene oxide based polyol, may be from 75 wt % to 100 wt % and/or from 80 wt % to 100 wt %. As would be understood by a person of ordinary skill in the art, the remainder of to the total weight of the first butylene oxide based polyol is derived from the initiator (e.g., any initiator commonly known for preparing a polyol having a nominal hydroxyl functionality of 3) and optionally propylene oxide and/or ethylene oxide.

The second butylene oxide based polyol may be derived from 50 wt % to 100 wt % of butylene oxide, based on the total weight of alkylene oxides in the polyol (i.e., includes a majority of butylene oxide content). For example, the second butylene oxide based polyol may be derived from 50 wt % to 90 wt %, 55 wt % to 85 wt %, 60 wt % to 80 wt %, and/or 65 wt % to 80 wt % of butylene oxide, with a remainder of the alkylene oxide content being propylene oxide and/or ethylene oxide. For example, second butylene oxide based polyol may be a polyoxybutylene-polyoxypropylene polyol or a polyoxybutylene-polyoxyethylene polyol having a nominal hydroxyl functionality of 2.

The first butylene oxide based polyol may have a higher butylene oxide content, based on weight percent of total alkylene oxide content of the polyol, than the second butylene oxide based polyol. The first butylene oxide based polyol may be a relatively lower molecular weight triol and the second butylene oxide based polyol may be a relatively higher molecular weight diol.

In the isocyanate-reactive component and/or curable composition, a ratio of a weight percentage of the first butylene oxide based polyol to a weight percentage of the second butylene oxide based polyol may be from 0.1 to 5.0, from 0.1 to 4.0, from 0.1 to 3.5, and/or from 0.2 to 3.0 (as rounded to the first decimal place according to convention). According to exemplary embodiments, the ratio of the first butylene oxide based polyol to the second butylene oxide based polyol may be varied to alter the mechanical properties of the resultant adhesive and/or coated formed using the curable composition. In a composition having a lower ratio of the first butylene oxide based polyol to the second butylene oxide based polyol, a cured product tensile strength may be lower, a cured product percent elongation at break may be higher, a cured product estimated Young's modulus may be lower, and a cured glass transition temperature in ° C. may be lower, relative to a similar composition having a relatively higher ratio of the first butylene oxide based polyol to the second butylene oxide based polyol. For example, when the ratio is at a higher end of the range from 0.1 to 3.5, a cured product of the curable composition has a higher tensile strength, a lower percent elongation at break, a higher Young's modulus, and a higher glass transition temperature, relative to when the ratio is at a lower end of the range from 0.1 to 3.5, which lower end of the range does not overlap the higher end of the range.

Said in another way, when a same composition is prepared, except with varied ratios of the first butylene oxide based polyol relative to the second butylene oxide based polyol, each of a cured tensile strength, a cured product percent elongation at break, a cured product estimated Young's modulus, and a cured glass transition temperature in ° C. may be varied in view of the intended use of the adhesive and/or coating. As would be understood by a person of ordinary skill in the art, by same composition it is meant that the same components are used in the compositions, the compositions are prepared using the same method, and the parts by weight of each component used in the composition is the same, except that the parts by weight of the first butylene oxide based polyol and the second butylene oxide based polyol are varied to adjust the ratio of the first butylene oxide based polyol relative to the second butylene oxide based polyol (such that the total parts by weight of the compositions may also be varied along with the weight percentage values based on the total weight of the compositions).

Accordingly, use of the first and second butylene oxide based polyols in the composition allows for versatility and ease of preparing resultant polyurethane products tailored to specific intended uses. In particular, as discussed below, each of at least the tensile strength, percent elongation at break, estimated Young's modulus, and glass transition temperature may be tailored and balanced with respect to each other to achieve a desired polyurethane product (adhesive and/or coating), by at least varying the ratio of the first butylene oxide based polyol relative to the second butylene oxide based polyol. As would be understood by a person of ordinary skill in the art, the final tensile strength, percent elongation at break, estimated Young's modulus, and glass transition temperature of a polyurethane product may be further adjusted by additives such as chain extenders, fillers, adhesion promoters, etc. As shown in the Examples, even with the addition of such additives, adjustment of the ratio of the first butylene oxide based polyol relative to the second butylene oxide based polyol, may still allow for precise control of desired properties. In addition, use of additives used in adhesives (such as adhesion promoters), may allow for precise control of other properties such as lap shear.

For example, when a relatively high cured tensile strength is desired in a final product, the amount of the first butylene oxide based polyol may be increased relative to the second butylene oxide based polyol, i.e., as the ratio of the first butylene oxide based polyol to the second butylene oxide based polyol is increased, the tensile strength of the cured adhesive or coating may also increase. Similarly, when a relatively low cured tensile strength is desired, the amount of the first butylene oxide based polyol may be decreased relative to the second butylene oxide based polyol, i.e., as the ratio of the first butylene oxide based polyol to the second butylene oxide based polyol is decreased, the tensile strength of the cured adhesive or coating may also decrease. Accordingly, the ratio of the first butylene oxide based polyol relative to the second butylene oxide based polyol, in same compositions, allows for control of the resultant tensile strength of a cured product. As such, use of the first and second butylene oxide based polyols in the composition allows for versatility and ease of preparing a resultant polyurethane product having a desired tensile strength.

For example, when a relatively high cured percent elongation at break is desired in a final product, the amount of the first butylene oxide based polyol may be decreased relative to the second butylene oxide based polyol, i.e., as the ratio of the first butylene oxide based polyol to the second butylene oxide based polyol is decreased, the percent elongation at break of the cured adhesive or coating may also increase. Similarly, when a relatively low percent elongation at break (e.g., to allow for a higher cured tensile strength) is desired, the amount of the first butylene oxide based polyol may be increased relative to the second butylene oxide based polyol, i.e., as the ratio of the first butylene oxide based polyol to the second butylene oxide based polyol is increased, the percent elongation at break of the cured adhesive or coating may also increase. Accordingly, the ratio of the first butylene oxide based polyol relative to the second butylene oxide based polyol, in same compositions, allows for control of the resultant percent elongation at break of a cured product. As such, use of the first and second butylene oxide based polyols in the composition allows for versatility and ease of preparing a resultant polyurethane product having a desired percent elongation at break.

For example, when a relatively high estimated Young's modulus is desired in a final product, the amount of the first butylene oxide based polyol may be increased relative to the second butylene oxide based polyol, i.e., as the ratio of the first butylene oxide based polyol to the second butylene oxide based polyol is increased, the Young's modulus of the cured adhesive or coating may also increase. Similarly, when a relatively low Young's modulus is desired, the amount of the first butylene oxide based polyol may be decreased relative to the second butylene oxide based polyol, i.e., as the ratio of the first butylene oxide based polyol to the second butylene oxide based polyol is decreased, the Young's modulus of the cured adhesive or coating may also decrease. Accordingly, the ratio of the first butylene oxide based polyol relative to the second butylene oxide based polyol, in same compositions, allows for control of the resultant estimated Young's modulus of a cured product. As such, use of the first and second butylene oxide based polyols in the composition allows for versatility and ease of preparing a resultant polyurethane product having a desired estimated Young's modulus.

For example, when a relatively high glass transition temperature is desired in a final product, the amount of the first butylene oxide based polyol may be increased relative to the second butylene oxide based polyol, i.e., as the ratio of the first butylene oxide based polyol to the second butylene oxide based polyol is increased, the glass transition temperature of the cured adhesive or coating may also increase. Similarly, when a relatively low glass transition temperature is desired, the amount of the first butylene oxide based polyol may be decreased relative to the second butylene oxide based polyol, i.e., as the ratio of the first butylene oxide based polyol to the second butylene oxide based polyol is decreased, the glass transition temperature of the cured adhesive or coating may also decrease. Accordingly, the ratio of the first butylene oxide based polyol relative to the second butylene oxide based polyol, in same compositions, allows for control of the resultant glass transition temperature of a cured product. As such, use of the first and second butylene oxide based polyols in the composition allows for versatility and ease of preparing a resultant polyurethane product having a desired glass transition temperature.

The blend of the first and second butylene oxide based polyols accounts for at least 50 wt % of a total weight of polyols in the isocyanate-reactive component (e.g., and present in free polyol form added to the curable composition, which free polyol form excludes any polyols present based on use of an isocyanate-terminated prepolymer in the isocyanate component). For example, the blend of the first and second butylene oxide based polyols may account for 55 wt % to 100 wt %, 60 wt % to 100 wt %, 65 wt % to 100 wt %, 70 wt % to 100 wt %, 75 wt % to 100 wt %, 80 wt % to 100 wt %, 85 wt % to 100 wt %, 90 wt % to 100 wt %, and/or 95 wt % to 100 wt % of the total weight of polyols in the isocyanate-reactive component and/or of the total weight of free polyol form added to the curable composition (e.g., excludes any excess polyol that may be added with any isocyanate terminated prepolymer included in the isocyanate component).

The first and second butylene oxide based polyols may be prepared by a polymerization reaction that includes adding at least butylene oxide to an initiator having from 2 to 8 (e.g., 2 to 6, 2 to 4, etc.) active hydrogen atoms. If the butylene oxide based polyol is an all BO polyol (i.e., all butylene oxide polyol), propylene oxide and ethylene oxide are not used in forming the polyol. If the polyol is a copolymer polyol, such as a BO/PO copolymer polyol (i.e., butylene oxide/propylene oxide copolymer polyol), the polymerization reaction includes adding at least two different alkylene oxides (e.g., BO and PO) to the initiator having from 2 to 8 active hydrogen atoms. The copolymer polyol may be a mixed oxide copolymer or a block copolymer. For example, the BO/PO copolymer polyol may have an internal block of PO with an external BO block. A catalyst for the polymerization reaction for forming the polyol may be anionic or cationic. Exemplary catalysts include, e.g., KOH, CsOH, boron trifluoride, and double-metal cyanide complex (DMC) catalysts such as a zinc hexacyanocobaltate or a quaternary phosphazenium compound.

A remainder, if present, of the total polyols in the isocyanate-reactive component (e.g., and the free polyols present in the curable composition) may include at least one polyether polyol and/or polyester polyol. The polyether polyol and/or polyester polyol may not be derived from butylene oxide. For example, the isocyanate-reactive component may include an additional polyether polyol that is a propylene oxide and/or ethylene oxide based polyether polyol, in addition to the blend of first and second butylene oxide based polyols. The additional polyether polyol may be a polyoxypropylene polyol, a polyoxyethylene polyol, or a polyoxypropylene-polyoxyethylene polyol. The additional polyether polyol may have a nominal hydroxyl functionality from 2 to 6 and a number average molecular weight from 200 g/mol to 10,000 g/mol. In an exemplary embodiment, an adhesive composition or coating composition includes from 2 wt % to 20 wt % (e.g., 5 wt % to 15 wt %, etc.) of a low molecular weight (e.g., from 100 g/mol to 800 g/mol) and low nominal functionality (e.g., from 2 to 3) polyoxypropylene polyol and/or polyoxypropylene-polyoxyethylene polyol.

The isocyanate-reactive component may further include a primary hydroxyl containing alcohol, such as a polybutadiene, a polytetramethylene ether glycol (PTMEG), a polypropylene glycol (PPG), a polyoxypropylene, and/or a polyoxyethylene-polyoxypropylene.

Additives

Various additives may be added to the curable composition to adjust characteristics of the resultant adhesive or coating, e.g., additives known to those of ordinary skill in the art may be used. Additives may be added as part of the isocyanate component and/or the isocyanate-reactive component. Exemplary additives include a catalyst, a chain extender, an adhesion promoter, a moisture scavenger, a curative, a pH neutralizer, a plasticizer, a compatibilizer, a filler (such as functional fillers, silica based fillers, and mineral based fillers), pigments/dyes, and/or a crosslinker.

A catalyst component may be added that includes at least one catalyst, e.g., may be added to the isocyanate-reactive component. For example, the catalyst component may have tin and/or amine based catalysts, e.g., that accounts for less than 5 wt % of a total weight of the isocyanate-reactive component. For example, a commercially available catalyst may be used. The catalysts may be used in small amounts, such as from 0.0015 wt % to 5 wt % (e.g., 0.01 wt % to 1.0 wt %, etc.). Examples of catalysts include tertiary amines, tin carboxylates, organotin compounds, tertiary phosphines, various metal chelates, and/or metal salts of strong acids (such as ferric chloride, stannic chloride, stannous chloride, antimony trichloride, bismuth nitrate, and bismuth chloride).

A chain extender component may be added that includes at least one chain extender, e.g., may be added to the isocyanate-reactive component. If included, the chain extender component may be account for 1 wt % to 25 wt % (e.g., 1 wt % to 20 wt %, 1 wt % to 15 wt %, 1 wt % to 12 wt %, 2 wt % to 12 wt %, etc.), of the total weight of the isocyanate-reactive component. Exemplary chain extenders include 1,4-butanediol, propylene glycol, dipropylene glycol, 2-ethylhexanediol, ethylene glycol, and diethylene glycol.

An adhesion promoter component may be added that includes at least one adhesion promoter, e.g., may be added to the isocyanate-reactive component. For example, the adhesion promoter component may include at least one silane based adhesion promoter. If included, the optional adhesion promoter may account for less than 5 wt % of a total weight of the isocyanate-reactive component.

A moisture scavenger component may be added that includes at least one moisture scavenger, e.g., may be added to the isocyanate-reactive component. If included, the moisture scavenger component may account for 1 wt % to 20 wt % (e.g., 1 wt % to 15 wt %, 1 wt % to 10 wt %, 1 wt % to 5 wt %, 2 wt % to 5 wt %, etc.) of the total weight of the isocyanate-reactive component. Exemplary moisture scavengers include zeolites or molecular sieves, reactive silanes (such as vinyltrialkoxysilanes), and minerals (such as calcium oxide).

Fillers may be present to provide desired rheological properties, mechanical reinforcement, chemical resistance, and/or reduce cost. The fillers may be added to the isocyanate-reactive component and/or the isocyanate component. Examples of fillers include inorganic particulate materials such as talc, titanium dioxide, calcium carbonate, calcium oxide, silica, mica, wollastonite, fly ash, metal particles, carbon black, graphite, high melting organic polymers, and/or reinforcements. Fillers also include reinforcements type fillers, e.g., flake or milled glass and/or fumed silica, which may be used to impart certain properties. Fillers may constitute up to 90% by weight of the curable composition.

A plasticizer may be present. If present, the plasticizer may be mixed with the poly(1,2-butylene oxide) polymer, e.g., to reduce its viscosity to facilitate mixing with the polyisocyanate, which typically has a much lower viscosity. The plasticizer may enable higher filler loading, reduce cost, and/or reduce modulus. Examples of suitable plasticizers include liquid (at 25° C.) esters of monocarboxylic acids and diesters of dicarboxylic acids having molecular weights of up to about 300.

Pigment and/or dyes may be present, e.g., titanium dioxide and/or carbon black, may be used to impart color properties. Other additives include, e.g., UV stabilizers, antioxidants, and air release agents, which may be independently used depending on the desired characteristics.

Curable Composition

Mixing and application of the curable composition may be done in any convenient manner. In the case in which the ingredients are formulated into two components (e.g., separate isocyanate-component and isocyanate-reactive component), the components may be combined at ambient temperature or any desirable elevated temperature, deposited onto the substrate and/or between substrates, and allowed to react and then cure. The mixing of the components may be done in any convenient way, depending on the particular application and available equipment. Mixing of the components may be done batchwise, mixing by hand or by using various kinds of batch mixing devices, followed by application by spraying, brushing, pouring, applying a bead and/or in other suitable manner. The two components may be packaged into separate cartridges and simultaneously dispensed through a static mixing device to mix and apply them, typically as a bead, onto the surface. In exemplary embodiments, a one-shot synthesis system may be useful for preparing the curable composition.

Formulations for adhesives and coatings are selected based on the physical properties of the adherends/substrates. Exemplary adherends/substrates include metals, plastics, woods, natural stone and minerals, paper products, and textiles. It is desirable that the components used in curable composition provide a wide range of mechanical and thermal properties. The components may also provide for low viscosities.

With respect to the curable composition, it has been found that adhesives and coatings formed using the blend of butylene oxide based polyols may provide good resistance to water uptake, while still realizing desirable thermal and/or mechanical properties. For example, the curable composition may provide improved thermal and/or mechanical properties for resultant cured products based on the hydrophobic nature of the first and second butylene oxide based polyols. The hydrophobic nature of the first and second butylene oxide based polyols may be demonstrated through wet aging studies that provide evidence of improved resistance to water uptake and plasticization compared with polymers prepared using non-hydrophobic polyols of comparable molecular weight and functionality. Further, the use of the first and second butylene oxide based polyols may not adversely impact key performance properties, e.g., when compared with analogous formulations prepared with non-hydrophobic polyols (such as all propylene oxide based polyols).

For example, a polyurethane based adhesive may include and/or consistent essentially of the curable composition according to embodiments discussed herewithin. A polyurethane based coating may include and/or consistent essentially of the curable composition according to embodiments discussed herewithin.

All parts and percentages are by weight, unless indicated otherwise. All values for molecular weight are based on number average molecular weight, unless indicated otherwise.

Examples

An approximate description of the materials used in the examples is as follows:

| | |
|---|---|
| BO Polyol 1 | A butylene oxide based polyether polyol derived from at least a majority of butylene oxide, having a nominal hydroxyl function of 3, a hydroxyl number of approximately 275 to295 mg KOH/g, and a number average molecular weight of approximately 600 g/mol (available as VORAPEL ™ T5001 from The Dow Chemical Company). |
| BO Polyol 2 | A butylene oxide based polyether polyol derived from at least a majority of butylene oxide, having a nominal hydroxyl functionality of 2, a hydroxyl number of approximately 56 mg KOH/g, a number average molecular weight of approximately 2000 g/mol, and derived from a majority of butylene oxide based on the total amount of alkylene oxides used to form the polyol (available as VORAPEL ™ D3201 from The Dow Chemical Company). |
| Isocyanate | A modified MDI that is a polycarbodiimide-modified diphenylmethane diisocyanate (available from The Dow Chemical Company as ISONATE ™ 143L). |
| Chain Extender | A solution of dipropylene glycol based chain extender (available from Sigma-Aldrich ®). |
| Additive 1 | A moisture scavenger (available as VORATRON ™ EG 711 from The Dow Chemical Company). |
| Additive 2 | An organotin catalyst (available as DABCO ® T-131 from Air Products). |
| Additive 3 | A solution of 3-glycidoxypropyl trimethoxysilane, an adhesion promoter (available from Sigma-Aldrich ®). |
| Additive 4 | A functional filler of calcined kaolin clay (available as KaMin 100C from KaMin Performance Materials). |
| Additive 5 | A fumed silica product (available as Cab-O-Sil ® TS-720 from Cabot). |

Referring to Table 1, Table 2, and Table 3, below, Working Examples 1 to 15 are prepared according to the following approximate formulations, which formulations may be usable for adhesives and/or coatings. With respect to Working Examples 1 to 15, it is demonstrated that a broad range of mechanical and thermal properties are achievable using at least varied ratios of BO Polyol 1 to BO Polyol 2 and varied amounts of the Chain Extender, e.g., a broad range of Young's Modulus and glass transition temperatures are achievable. In particular, as would be understood by a person of ordinary skill in the art, the desired mechanical and thermal properties may be varied based on intended use of the formulation.

Working Examples 1 to 15 are prepared by first pre-blending the polyols, the optional chain extender, and the additives in a FlackTek SpeedMixer™ mixing cup for 40 seconds at 2100 rpm to form a blended mixture. Next, the Isocyanate is then added to the blended mixture, and the resultant mixture is mixed for 40 seconds at 2100 rpm. Then, the resultant mixture is poured into flat circular molds that are left open to the atmosphere to start the curing process. These plaques are allowed to cure for approximately four hours at room temperature (approximately 22° C.), followed by an approximately two hours of post-curing at 80° C. Referring to Tables 1 to 3, the tensile strength values, percent elongation at break values, and Young's modulus values for the cured samples are determined according to ASTM D-1708. The glass transition temperatures of the cured samples are determined using dynamic mechanical analysis and are assigned as the temperature at which the tan delta peak reaches a maximum.

Formulation Variations

A first comparative example based on use of BO Polyol 1 without BO Polyol 2, is determined as having mechanical properties below that which is generally sought for use as an adhesive or coating (i.e., is very tacky and may not be optimal for use as an adhesive or coating). A second comparative example based on use of BO Polyol 2 without BO Polyol 1, is determined as having a Young's Modulus above that which is generally sought for use as an adhesive or coating (i.e., is very brittle/glassy and may not be optimal for use as an adhesive or coating).

Referring to Table 1, below, Working Examples 1 to 5 that exclude the Chain Extender, are prepared according to the approximate formulations in Table 1, in which formulations the ratios of BO Polyol 1 to BO Polyol 2 are varied from 0.2 to 3.0.

TABLE 1

|  | Ex. 1 | Ex. 2 | Ex. 3 | Ex. 4 | Ex. 5 |
|---|---|---|---|---|---|
| Components (wt %) | | | | | |
| BO Polyol 1 | 11.6 | 21.5 | 30.1 | 37.7 | 44.3 |
| BO Polyol 2 | 65.6 | 50.2 | 36.9 | 25.1 | 14.8 |
| Isocyanate | 19.0 | 24.5 | 29.2 | 33.4 | 37.1 |
| Chain Extender | — | — | — | — | — |
| Additive 1 | 3.8 | 3.8 | 3.8 | 3.8 | 3.8 |
| Additive 2 | <0.01 | <0.01 | <0.01 | <0.01 | <0.01 |
| Properties | | | | | |
| Ratio BO Polyol 1 to BO Polyol 2 | 0.2 | 0.4 | 0.8 | 1.5 | 3.0 |
| Average Polyol Functionality | 2.5 | 2.7 | 2.8 | 2.9 | 2.9 |
| Isocyanate Index | 105 | 105 | 105 | 105 | 105 |
| Cured Tensile Strength (psi) | 314 | 569 | 1467 | 2451 | 4394 |
| Cured Percent Elongation at Break | 223 | 180 | 175 | 134 | 50 |
| Cured Young's Modulus (estimated, psi) | 249 | 574 | 5619 | 72,353 | 196,157 |
| Cured Glass Transition Temp (Tg in ° C.) | −19 | 1 | 22 | 34 | 48 |

Referring to Table 2, below, Working Examples 6 to 10 that include from 2.7 wt % to 4.7 wt % (1.11 parts by weight based on total parts of the formulation used) of the Chain Extender, are prepared according to the approximate formulations in Table 2, in which formulations the ratios of BO Polyol 1 to BO Polyol 2 are varied from 0.2 to 3.0.

TABLE 2

|  | Ex. 6 | Ex. 7 | Ex. 8 | Ex. 9 | Ex. 10 |
|---|---|---|---|---|---|
| Components (wt %) | | | | | |
| BO Polyol 1 | 10.6 | 19.1 | 26.3 | 32.2 | 37.4 |
| BO Polyol 2 | 59.8 | 44.8 | 32.1 | 21.6 | 12.6 |
| Isocyanate | 23.1 | 29.1 | 34.0 | 38.2 | 41.4 |
| Chain Extender | 2.7 | 3.2 | 3.8 | 4.2 | 4.7 |
| Additive 1 | 3.8 | 3.8 | 3.8 | 3.8 | 3.9 |
| Additive 2 | <0.01 | <0.01 | <0.01 | <0.01 | <0.01 |
| Properties | | | | | |
| Ratio BO Polyol 1 to BO Polyol 2 | 0.2 | 0.4 | 0.8 | 1.5 | 3.0 |
| Average Polyol Functionality | 2.5 | 2.7 | 2.8 | 2.9 | 2.9 |
| Isocyanate Index | 105 | 105 | 105 | 105 | 105 |
| Cured Tensile Strength (psi) | 472 | 1485 | 2694 | 2990 | 6495 |
| Cured Percent Elongation at Break | 293 | 262 | 185 | 77 | 46 |
| Cured Young's Modulus (estimated, psi) | 322 | 1712 | 39,210 | 149,512 | 218,845 |
| Cured Glass Transition Temp (Tg in ° C.) | −9 | 14 | 31 | 46 | 56 |

Referring to Table 3, below, Working Examples 11 to 15 that include from 6.6 wt % to 10.6 wt % (2.22 parts by weight based on total parts of the formulation used) of the Chain Extender, are prepared according to the approximate formulations in Table 3, in which formulations the ratios of BO Polyol 1 to BO Polyol 2 are varied from 0.2 to 3.0.

TABLE 3

|  | Ex. 11 | Ex. 12 | Ex. 13 | Ex. 14 | Ex. 15 |
|---|---|---|---|---|---|
| Components (wt %) | | | | | |
| BO Polyol 1 | 9.0 | 15.7 | 21.0 | 25.1 | 28.4 |
| BO Polyol 2 | 51.0 | 36.7 | 25.5 | 16.7 | 9.5 |
| Isocyanate | 29.6 | 35.8 | 40.6 | 44.5 | 47.6 |
| Chain Extender | 6.6 | 8.0 | 9.0 | 9.9 | 10.6 |
| Additive 1 | 3.8 | 3.8 | 3.9 | 3.8 | 3.9 |
| Additive 2 | <0.01 | <0.01 | <0.01 | <0.01 | <0.01 |

TABLE 3-continued

| | Ex. 11 | Ex. 12 | Ex. 13 | Ex. 14 | Ex. 15 |
|---|---|---|---|---|---|
| Properties | | | | | |
| Ratio BO Polyol 1 to BO Polyol 2 | 0.2 | 0.4 | 0.8 | 1.5 | 3.0 |
| Average Polyol Functionality | 2.5 | 2.7 | 2.8 | 2.9 | 2.9 |
| Isocyanate Index | 105 | 105 | 105 | 105 | 105 |
| Cured Tensile Strength (psi) | 1368 | 2772 | 3633 | 5866 | 7690 |
| Cured Percent Elongation at Break | 340 | 212 | 158 | 42 | 21 |
| Cured Young's Modulus (estimated, psi) | 1132 | 41,664 | 125,462 | 224,519 | 235,011 |
| Cured Glass Transition Temp (Tg in °C.) | 10 | 43 | 56 | 60 | 70 |

As is shown above in Tables 1 to 3, as the ratio of the BO Polyol 1 to BO Polyol 2 increases, a pattern in which the cured tensile strength increases, the cured percent elongation at break decreases, the cured Young's modulus increases, and the cured glass transition temperature increases is realized. Accordingly, a variety of material types may be prepared by modulating the ratio of the BO Polyol 1 to the BO Polyol 2 (among other factors such as the amount of the Chain Extender). For example, a variety of materials may be prepared by varying the amount of a BO based diol (e.g., high molecular weight) to a BO based triol (e.g., low molecular weight). Tensile strengths ranged from approximately 300 to 7000 psi can be observed, percent elongations at break between approximately 300% and 20% can be observed, and/or glass transition temperatures from as low as −19° C. to as high as 70° C. can be observed.

Adhesive Formulations

Referring to Table 4, below, Working Examples 16, 17, and 18, are prepared using the formulations of Examples 11, 12, and 13, respectively. In particular, Working Examples 16, 17, and 18, are evaluated for adhesion by the addition of an adhesion promoter to the formulations, and lap shear testing is performed on the cured samples with respect to cold-rolled steel and aluminum substrates. Example 16 corresponds to Example 11 in Table 3, above, with the addition of approximately 0.01 wt % of Additive 3, based on the total weight of Example 16. Example 17 corresponds to Example 12 in Table 3, above, with the addition of approximately 0.01 wt % of Additive 3, based on the total weight of Example 17. Example 18 corresponds to Example 13 in Table 3, above, with the addition of approximately 0.01 wt % of Additive 3, based on the total weight of Example 18. Lap Shear is measured according to ASTM D-1002.

TABLE 4

| | Ex. 16 | Ex. 17 | Ex. 18 |
|---|---|---|---|
| Lap Shear Adhesion to Cold-Rolled Steel (psi) | 156 | 688 | 1712 |
| Lap Shear Adhesion to Aluminum (psi) | 192 | 896 | 1496 |

As shown in Table 4, as the ratio of the BO Polyol 1 to BO Polyol 2 increases (from 0.2 to 0.8), as does the lap shear. Accordingly, even with the addition of the adhesion promoter of as additive, properties of a resultant adhesive may be adjusted by varying the ratio of the BO Polyol 1 to the BO Polyol 2.

Referring to Table 5, below, Working Examples 19, 20, and 21 are prepared for further adhesion testing using the composition described in Example 17, further modified to include additional additives and to enable lap shear testing with aluminum substrates at three different isocyanate indices (i.e., 105, 110, and 120). Whereas, as would be understood by a person of ordinary skill in the art, the isocyanate index is varied by varying the amount of the Isocyanate used, without varying the amounts of the other components. Further, Examples 19, 20, and 21 are prepared by further adding 19.0 parts by weight of Additive 4 (about 39-40 wt %, based on the total weight of Examples 19, 20, and 21) and 0.3 parts of Additive 5 (less than 0.01 wt %, based on the total weight of Examples 19, 20, and 21).

TABLE 5

| | Ex. 19 | Ex. 20 | Ex. 21 |
|---|---|---|---|
| Isocyanate Index | 105 | 110 | 120 |
| Lap Shear Adhesion to Aluminum (psi) | 1117 | 1318 | 1543 |

Referring to Table 5, an improvement in lap shear adhesion for aluminum substrates may be realized at an isocyanate index of 120 relative to an isocyanate index of 105.

Wet Aging

The utility of employing formulations (e.g., adhesive formulations) that include BO polyols may be demonstrated by wet aging studies performed on cured systems.

The examples for the wet aging studies use the following additional components:

| | |
|---|---|
| Polyol A | A propylene oxide based triol, having a number average molecular weight of approximately 450 g/mol (available as VORANOL ™ CP 450 from The Dow Chemical Company). |
| Polyol B | A propylene oxide based diol, having a number average molecular weight of approximately 2000 g/mol (available as VORANOL ™ 220-056 from The Dow Chemical Company). |
| PO Polyol 1 | A propylene oxide based diol, having a number average molecular weight of approximately 212 g/mol (available as VORANOL ™ 220-530 from The Dow Chemical Company). |

-continued

| | |
|---|---|
| Prepolymer | A modified diphenylmethane diisocyanate (MDI) based prepolymer having an NCO (isocyanate moiety) content of approximately 23.0 wt % (available as ISONATE ™ 181 from The Dow Chemical Company). |
| Additive 6 | A polyurethane catalyst (available as BiCAT ® 8 from Shepherd). |
| Additive 7 | A processing additive/compatibilizer for polyurethane additives (available as BYK ® P9908 from ALTANA). |
| Additive 8 | A filler based on calcium carbonate (available as ULTRA-PFLEX ® from Specialty Minerals). |

Referring to Table 6, below, Working Example 22 is a BO-polyol based system and Comparative Example A is an all PO-polyol based system including polyols of a similar molecular weight as the BO-polyol based system. Working Example 22 and Comparative Example A are prepared according to the approximately formulations in Table 6. Further, Working Example 22 and Comparative Example A are prepared and cured using the same method as described with respect to Working Examples 1 to 15. Then, for wet aging studies, the resultant samples are fully immersed in water for 15 days at 25° C. Changes in tensile strength, estimated Young's modulus, and mass after wet aging are recorded and the data is summarized in Table 6.

TABLE 6

| | Ex. 22 | Ex. A |
|---|---|---|
| Components (weight percent) | | |
| BO Polyol 1 | 14.3 | — |
| Polyol A | — | 11.2 |
| BO Polyol 2 | 31.6 | — |
| Polyol B | — | 32.7 |
| PO Polyol 1 | 12.0 | 12.4 |
| Isocyanate | 18.9 | 19.6 |
| Prepolymer | 18.9 | 19.6 |
| Additive 1 | 4.3 | 4.5 |
| Additive 6 | <0.01 | <0.01 |
| Properties | | |
| % Retention of Tensile Strength | 84 | 64 |
| Initial Tensile Strength (psi) | 3842 | 4508 |
| Tensile Strength after wet aging for 15 days at 25° C. (psi) | 3228 | 2906 |
| % Retention of Young's Modulus | 76 | 63 |
| Initial Estimated Young's Modulus (psi) | 119,073 | 142,561 |
| Estimated Young's Modulus after wet aging for 15 days at 25° C. (psi) | 90,433 | 90,560 |
| % Mass change, after wet aging for 15 days at 25° C. | 1.2 | 2.2 |

Referring to Table 6, changes in tensile strength, Young's modulus, and mass, after wet aging are recorded. Working Example 22 retain approximately 20% more of the initial tensile strength and approximately 13% more of the initial tensile modulus, as compared to Comparative Example A. Working Example 22 also absorbs nearly half as much water as Comparative Example A. Without intending to be bound by this theory, the steeper decline in mechanical properties after wet aging observed for Comparative Example A may be attributed to plasticization caused by higher water uptake in the sample. Accordingly, use of the blend of BO Polyol 1 and BO Polyol 2 in Working Example 22 is shown to possess higher resistance to water ingress and plasticization when compared to materials prepared using non-hydrophobic polyether polyols of comparable equivalent weight and functionality.

Referring to Table 7, below, Working Example 23 and Comparative Example B, are similar to Working Example 22 and Comparative Example A, respectively, with the inclusion of additional fillers, adhesion promoters, and compatibilizers. In particular, Working Example 23 additional includes approximately 0.79 parts by weight of Additive 3 (about 0.2 wt %), 0.34 parts by weight of Additive 5 (less than 0.01 wt %), 0.15 parts by weight of Additive 7 (less than 0.01 wt %), and 16.33 parts by weight of Additive 8 (about 37.1 wt %), whereas weight percentage values are based on the total weight of the Working Example 23. Comparative Example B includes approximately 0.76 parts by weight of Additive 3 (about 0.2 wt %), 0.33 parts by weight of Additive 5 (less than 0.01 wt %), 0.14 parts by weight of Additive 7 (less than 0.01 wt %), and 15.77 parts by weight of Additive 8 (about 37.1 wt %), whereas weight percentage values are based on the total weight of the Comparative Example B.

TABLE 7

| Substrate | Ex. 23 Lap Shear (psi) | Ex. B Lap Shear (psi) |
|---|---|---|
| Cold-Rolled Steel | 1400 | 1293 |
| Aluminum | 1256 | 1095 |
| ABS | 554 | 566 |
| Polyvinyl Chloride | 938 | 880 |
| Polystyrene | 514 | 514 |

Referring to Table 7, lap shear testing is performed using five different substrates, i.e., a cold-rolled steel based substrate, an aluminum based substrate, an ABS based substrate (an acrylonitrile-butadiene-styrene based substrate), a polyvinyl chloride based substrate, and a polystyrene based substrate. Lap shear testing is measured according to ASTM D-1002 for the cold-rolled steel and aluminum based substrates and ASTM D-3163 for the ABS, polyvinyl chloride, and polystyrene based substrates. Aluminum and cold-rolled steel adherends are obtained from ACT Test Panels and are wiped with 2-butanone prior to application of respective adhesives. Plastic adherends are lightly abraded with medium grit sandpaper and wiped with methanol prior to application of respective adhesives.

Comparable lap shear adhesion values are obtained for Working Example 23 and Comparative Example B, demonstrating that the increased hydrophobic character of the BO polyols does not adversely impact adhesion, while providing improved wet aging performance, e.g., as discussed above with respect to Table 6.

As would be understood by a person of ordinary skill in the art, the above compositions may be used for forming adhesives or coatings, whereas the composition is used as an adhesive when placed between two layers/substrates and the composition is used as a coating when placed on an outer layer/substrate.

The invention claimed is:

1. A curable composition, comprising:
a reaction product of:
an isocyanate component that includes one or more isocyanates, an isocyanate index being from 90 to 150; and
an isocyanate-reactive component that includes a blend including from 5 wt % to 95 wt % of a first butylene oxide based polyol and from 5 wt % to 95 wt % of a second butylene oxide based polyol, based on a total weight of the blend, the first butylene oxide based polyol having a number average molecular weight from 200 g/mol to 1,000 g/mol and a nominal hydroxyl functionality from 2 to 6, the second butylene oxide based polyol having a number average molecular weight greater than 1,000 g/mol and less than 8,000 g/mol and a nominal hydroxyl functionality from 2 to 4, and the blend accounting for at least 60 wt % of a total weight of polyols in the isocyanate-reactive component.

2. The composition as claimed in claim 1, wherein the first butylene oxide based polyol is derived from 75 wt % to 100 wt % of butylene oxide, based on a total weight of alkylene oxides, and has a nominal hydroxyl functionality of 3.

3. The composition as claimed in claim 1, wherein the second butylene oxide based polyol is a polyoxybutylene-polyoxypropylene polyol having a nominal hydroxyl functionality of 2 or a polyoxybutylene-polyoxyethylene polyol having a nominal hydroxyl functionality of 2.

4. The composition as claimed in claim 1, wherein the second butylene oxide base polyol has a number average molecular weight from 1,500 g/mol to 3,000 g/mol.

5. The composition as claimed in claim 1, wherein a ratio of a weight percentage of the first butylene oxide based polyol in the isocyanate-reactive component to a weight percentage of the second butylene oxide based polyol in the isocyanate-reactive component in the blend is in a range from 0.1:1.0 to 3.5:1.0.

6. The composition as claimed in claim 1, wherein the isocyanate-reactive component further includes a polyether polyol different from the first and second butylene oxide based polyols.

7. The composition as claimed in claim 1, wherein the isocyanate component includes from 20 wt % to 100 wt %, based on the total weight of the isocyanate component, of one or more isocyanate terminated prepolymers having an isocyanate group content from 1 wt % to 35 wt %.

8. A polyurethane based adhesive, comprising the curable composition as claimed in claim 1.

9. A polyurethane based coating, comprising the curable composition as claimed in claim 1.

10. The composition as claimed in claim 1, wherein the blend accounts for at least 80 wt % of the total weight of polyols in the isocyanate-reactive component.

11. The composition as claimed in claim 10, wherein a ratio of a weight percentage of the first butylene oxide based polyol in the isocyanate-reactive component to a weight percentage of the second butylene oxide based polyol in the isocyanate-reactive component in the blend is in a range from 0.1:1.0 to 3.5:1.0.

12. The composition as claimed in claim 11, wherein the first butylene oxide based polyol is derived from 75 wt % to 100 wt % of butylene oxide, based on a total weight of alkylene oxides, and has a nominal hydroxyl functionality of 3 and the second butylene oxide based polyol is a polyoxybutylene-polyoxypropylene polyol having a nominal hydroxyl functionality of 2 or a polyoxybutylene-polyoxyethylene polyol having a nominal hydroxyl functionality of 2.

13. The composition as claimed in claim 1, wherein the blend accounts for at least 90 wt % of the total weight of polyols in the isocyanate-reactive component.

14. The composition as claimed in claim 13, wherein a ratio of a weight percentage of the first butylene oxide based polyol in the isocyanate-reactive component to a weight percentage of the second butylene oxide based polyol in the isocyanate-reactive component in the blend is in a range from 0.1:1.0 to 3.5:1.0.

15. The composition as claimed in claim 14, wherein the first butylene oxide based polyol is derived from 75 wt % to 100 wt % of butylene oxide, based on a total weight of alkylene oxides, and has a nominal hydroxyl functionality of 3 and the second butylene oxide based polyol is a polyoxybutylene-polyoxypropylene polyol having a nominal hydroxyl functionality of 2 or a polyoxybutylene-polyoxyethylene polyol having a nominal hydroxyl functionality of 2.

* * * * *